July 7, 1970 P. SCHWARZ 3,519,868

COLOR TELEVISION TUBE SHADOW MASK PROVIDED WITH CONCAVE MIRRORS SURROUNDING EACH APERTURE AND FACING THE PHOSPHOR SCREEN

Filed July 17, 1967

United States Patent Office 3,519,868

Patented July 7, 1970

3,519,868

COLOR TELEVISION TUBE SHADOW MASK PROVIDED WITH CONCAVE MIRRORS SURROUNDING EACH APERTURE AND FACING THE PHOSPHOR SCREEN

Peter Schwarz, 1501 Rexford Drive,
Los Angeles, Calif. 90035

Filed July 17, 1967, Ser. No. 658,302
Int. Cl. H01j *29/18, 29/46*
U.S. Cl. 313—85 3 Claims

ABSTRACT OF THE DISCLOSURE

The screen of this color television picture tube is not aluminized, but concave mirrors are positioned around each hole of the shadow-mask, which reflect light so that each dot of a group contains all three colors of that group.

This invention relates to an improvement in color television picture tubes.

In picture tubes, as now in use, each point area is reproduced by three dots; one red; one green; one blue. Therefore, if a large area of the screen be for instance only red, only the red phosphor dots would be excited and the other two dots of the group would remain without light. Two-thirds of the picture area would be dark. Though the color dots are quite small, the quality of the color picture as a whole nevertheless suffers. It is, therefore, one object of this invention to improve the quality of the color picture. This is done by giving each dot the appropriate color information. Each dot having the red, the green and the blue information, in contrast to having only one information.

It is another object to selectively add more light to the picture screen. For instance to add more light to the dots having the least light emitting properties. This would allow the use of the other colors at a higher level. It is another advantage of this tube that, inasmuch the screen is not aluminized it requires a much lower voltage than other tubes.

Figure 1:
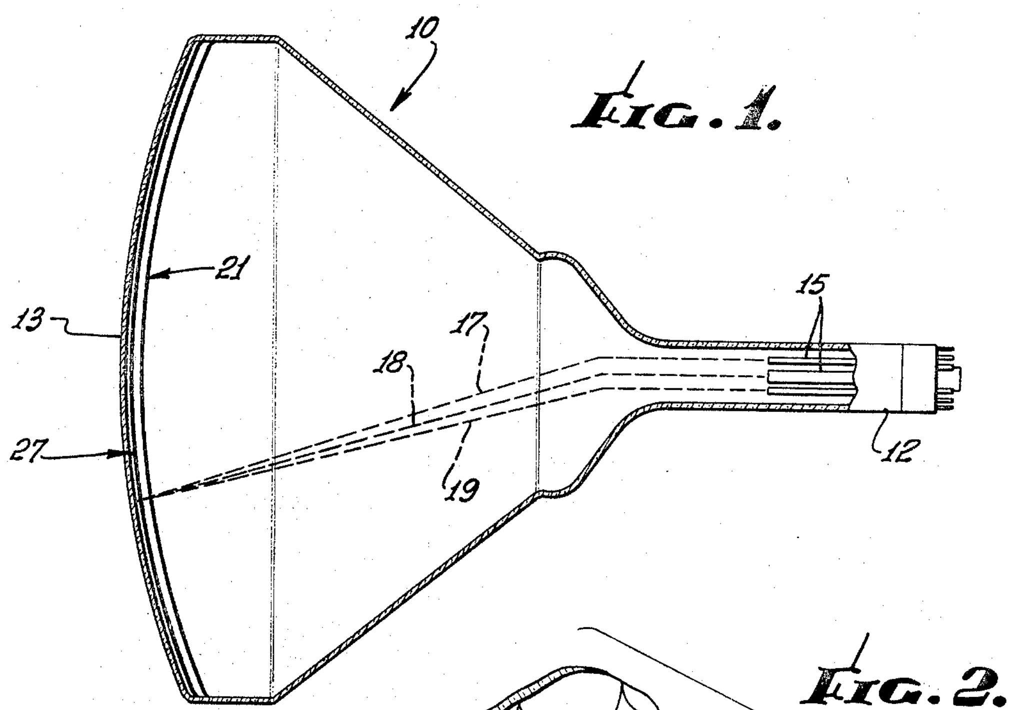
FIG. 1 is a general representation of a color television picture tube.

In FIG. 1 15 is a three gun structure including all the electrical circuitry (not shown) which emits three beams of electrons, 17, 18, 19. These electron beams pass through the openings of the shadow-mask 21 and hit the phosphor screen 27.

Figures 2, 3:
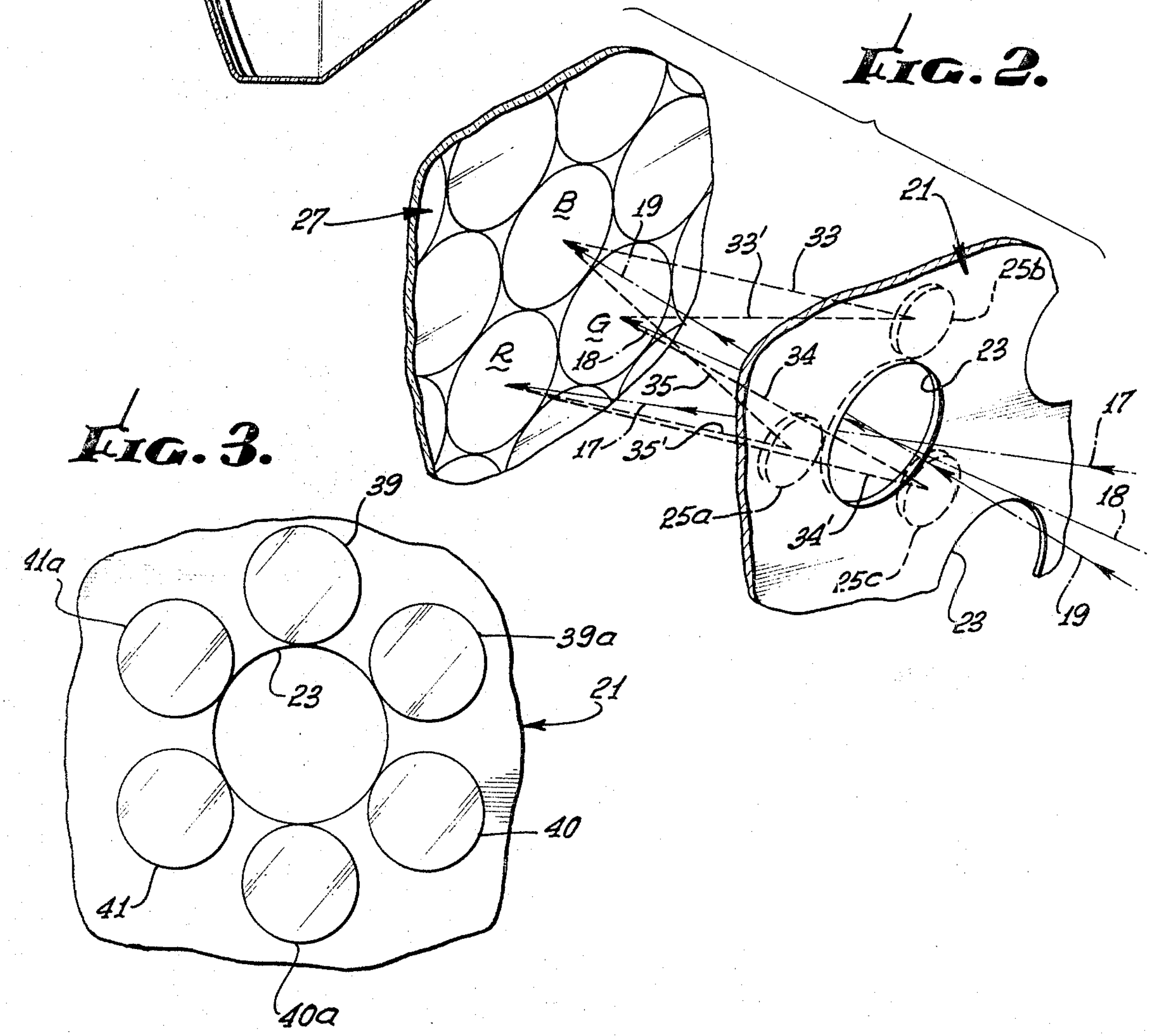
FIG. 2 represents an enlarged section of the phosphor screen and the shadow-mask.
FIG. 3 is another representation of an enlarged shadow-mask section.

The phosphor screen 27 in FIG. 2 consists of groups of three dots; each such dot emitting light of a different color, Red—R, Green—G, and Blue—B, when struck by the electron beams. Each such group of three dots represents one unit area of the picture. Before striking the phosphor screen, the electron beams pass through the opening 23 of the shadow mask, which permits each beam to reach only one of the color emitting dots. Electron beam 17 will strike R, 18 will strike G and 19 will strike B. The three dots R, G and B will emit red, green and blue light according to the intensity of the beams when struck. The size of the opening 23 is about the same as one dot, namely ⅓ of a color group. The rest, namely ⅔ of the shadow mask is opaque to electrons and the electrons hitting the opaque parts of the shadow mask do not serve any useful purpose. Around each opening are groups of reflective surfaces 25*a*, 25*b* and

25*c*. These mirrors are so positioned that 25*a* will reflect the light appearing on B to R and of course from R to B. This is shown by numbers 35 and 35¹, mirror 25*b* will reflect from G to B and B to G, as shown by 33 and 33¹ and 25*c* G to R and R to G, 34 and 34¹.

These reflective surfaces may be concave indentations in the shadow mask, covered with a thin film of reflective material such as aluminum, silver, etc., which will produce the desired images. These indentations, which are about the same size as the holes are produced by the same photo-chemical process as the holes are produced. A description of this process may for instance be found in the RCA Review vol. 12, page 481 of September 1951. The negative containing the negatives of the holes also contain the negatives of the indentations. The geometry of the indentations is given by the position of the holes only, which in turn determines the locations of the different phosphors on the screen. Inasmuch as the phosphor screen consists of translucent material, a viewer will see at each dot all the three colors of the group. It may be noted that the color balance of each group will not be disturbed by the additional light reflected from the mirrors. Such additional light comes only from its own group.

FIG. 3 shows an arrangement which contains six mirrors. More mirrors will of course throw more light back to the phosphor screen.

The mirrors may also be used to selectively throw only one or two colors back to the screen, or reflect its own color upon itself or for any other useful purpose. In these cases, they need not be in groups of three.

I claim:

1. A color television picture tube, having an electronic gun structure, a shadow mask with openings therein, a translucent screen composed of groups of three phosphor dots emitting light of three different colors when excited by electrons, in combination with groups of three reflecting surfaces positioned around each opening and facing said screen so that each such surface reflects light from one colored dot to another of the same group.

2. A color television picture tube, having an electronic gun structure, a translucent screen consisting of dots emitting light of three different colors when hit by electrons, in combination with a shadow mask having electron-passing apertures and plural light reflecting mirrors surrounding said apertures for producing images of said colored light emitting dots upon said screen.

3. The method of forming a picture on a color television picture tube screen having plural separate groups of plural dots which each emit different colored light both forward and backward, in combination with the step of reflecting the backward light from a shadow mask for each group back to said screen so that images of said dots appear in focus in different positions within the same group on said screen than the position occupied by the dot which emitted the light forming each image.

References Cited

UNITED STATES PATENTS 2,795,719 6/1957 Morrell ------------ 313—85

JAMES W. LAWRENCE, Primary Examiner

V. LAFRANCHI, Assistant Examiner

U.S. Cl. X.R.

313—92